United States Patent [19]

Fotheringham et al.

[11] Patent Number: 4,637,488
[45] Date of Patent: Jan. 20, 1987

[54] AXLE ASSEMBLY

[75] Inventors: James R. Fotheringham, Willowick; David L. Morrow, S. Euclid, both of Ohio

[73] Assignee: Caterpillar Industrial Inc., Mentor, Ohio

[21] Appl. No.: 775,191

[22] Filed: Sep. 12, 1985

[51] Int. Cl.⁴ .................... B60K 17/30; B60T 8/00
[52] U.S. Cl. .................... 180/253; 73/493; 188/181 R; 303/100
[58] Field of Search ............... 180/79, 79.1, 167, 168, 180/169, 252, 253, 264, 197; 73/493, 494, 509; 324/160, 166, 171; 340/870.37; 188/181 R, 181 A; 303/95, 100

[56] References Cited

U.S. PATENT DOCUMENTS

| | | | |
|---|---|---|---|
| 3,331,460 | 7/1967 | Bacon | 180/208 |
| 3,554,479 | 1/1971 | Slemmons | 73/493 X |
| 3,652,886 | 3/1972 | Riordan et al. | 310/168 |
| 3,915,266 | 10/1975 | Lantz | 188/181 |
| 3,978,357 | 8/1976 | Voelbel et al. | 310/168 |
| 4,029,180 | 6/1977 | Gee | 188/181 R |
| 4,090,592 | 5/1978 | Jovick et al. | 188/181 R |
| 4,161,120 | 7/1979 | Cloarec | 73/494 |
| 4,189,637 | 2/1980 | Takamatsu et al. | 250/231 |
| 4,288,746 | 9/1981 | Singbartl | 324/174 |

FOREIGN PATENT DOCUMENTS 2755379 6/1979 Fed. Rep. of Germany .
2348093 11/1977 France .

Primary Examiner—John J. Love
Assistant Examiner—Charles R. Watts
Attorney, Agent, or Firm—Alan J. Hickman

[57] ABSTRACT

Axle assemblies having a sensor of the mechanical input shaft type are difficult to access and subjected to radial and axial loads which cause premature failure. A connecting arrangement affixes a sensor body to a support bracket adjacent a second end of a rotatable spindle and maintains an input shaft of the sensor within a preselected range of axially aligned positions with respect to a spindle axis. A coupling arrangement couples the second end portion of the spindle to the input shaft and transfers only rotational motion from the spindle to the input shaft. The coupling arrangement permits a preselected amount of freedom of movement of the spindle relative to the sensor in axial and radial directions. Thus, damage to and premature failure of the sensor is alleviated and accessability is substantially improved. The axle assembly is particularly suited for use on an automatic guided vehicle.

17 Claims, 3 Drawing Figures

AXLE ASSEMBLY

TECHNICAL FIELD

This invention relates generally to an axle assembly having a sensor connected thereto, and more particularly to an axle assembly having a spindle rotatably connected to a support bracket, a carrier for connecting a sensor body to the support bracket, and a coupling for connecting a sensor input shaft to the spindle.

BACKGROUND ART

Sensors for transmitting signals representative of the speed and/or position of a vehicle axle have been known for some time. Sensors of this type are shown in, for example, U.S. Pat. No. 4,189,637 to Hiroshi Takamatsu dated Feb. 19, 1980, and U.S. Pat. No. 3,915,266 to Charles H. Lantz dated Oct. 28, 1975. In each of these patents, the spindle upon which the wheel is mounted is fixed. Therefore, it is possible to run electrical conduits between the sensor and a control unit without any danger of wear, damage, or the like caused by exposure of the conductors to rotatable members. In embodiments where the spindle rotates, the teachings of the patents set forth above would not permit the mounting of the sensor adjacent and end of the spindle, the most desirable location for reasons of serviceability and assembly.

U.S. Pat. No. 4,161,120 to Jean-Claude Cloarec dated July 17, 1979, and U.S. Pat. No. 4,288,746 to Gunther Singbartl dated Sept. 8, 1981 disclose a fixed wheel spindle, a hub rotatably mounted on the spindle, and a proximity type sensor having a rotor mounted on the rotating member and a stator affixed to an adjacent stationary member. Conversely, U.S. Pat. No. 3,652,886 to Hugh E. Riordan et al. discloses a rotatable spindle with the rotor mounted on the rotating member and the stator affixed to an adjacent stationary member. It is to be recognized that these arrangements locate the sensor at positions other than at the accessible end of the spindle, and therefor, are difficult to service, assemble, or disassemble the sensor from the vehicle.

It is often necessary to utilize a sensor which is capable of generating more than one output signal so that more than one parameter may be monitored. For example, in automatic guided vehicles, it is necessary to know both the speed of rotation of the wheel and the position of rotation of the wheel relative to a set point so that the exact position of the vehicle within the facilities in which it operates can be known to a relatively precise degree. An example of a device which is sensitive enough and capable of providing more than one output is known as a resolver. In order to utilize the resolver, a mechanical connection between the input shaft of the resolver and the rotating member is required. Due to the accuracy requirements, it is necessary to connect the resolver in a manner so that only a controlled amount of relative motion between the rotating member and the resolver shaft is permitted. Also, it is necessary to provide a connection which places substantially no side or radial force on the shaft and thereby prevent often encountered premature mechanical failure of the resolver.

The present invention is directed to overcoming one or more of the problems as set forth above.

DISCLOSURE OF THE INVENTION

In one aspect of the present invention, an axle assembly has a housing, an output member rotatably connected to the housing, and a support bracket. The support bracket has first and second end portions and is connected at the first end portion to the output member. A spindle having first and second end portions is rotatably connected to the second end portion of the support bracket. A sensor having a body and an input shaft rotatably connected to the body is provided for delivering a control signal in response to the position of the input shaft. A connector is provided for connecting the sensor body to the support bracket at a location adjacent the second end of the spindle and maintaining the axis of the input shaft within a preselected range of axially aligned positions with respect to the spindle axis. A coupling couples the second end portion of the spindle to the input shaft and transfers rotational motion from the spindle to the input shaft. The coupling is free to move axially and radially relative to the spindle axis.

In another aspect of the present invention, a steerable axle assembly has a housing, and an output member having a first end is rotatably connected to the housing. A support bracket having first and second end portions is connected at the first end portion to the first end of the output member, and the second end portion of the support bracket has first and second spaced apart sides, and a bore disposed in the second end portion which opens at the first and second sides. A spindle has first and second end portions, first and second opposed ends and a longitudinal spindle axis extending between the first and second spindle ends. The spindle has an aperture disposed in and opening at the second spindle end and is mounted in the support bracket bore and rotatable about the spindle axis. The first spindle end portion is adapted to be connected to a ground engaging wheel and the second spindle end portion is positioned adjacent the second side of the support bracket. A sensor having a body and an input shaft is rotatably connected to the body and rotatable about a longitudinal input shaft axis. A connecting arrangement attaches the sensor body to the second end portion of the support bracket adjacent the second side and substantially aligns a longitudinal axis of the input shaft with the longitudinal axis of the spindle. A coupling having a driving portion is mounted on the input shaft. The driving portion is radially spaced from the input shaft, axially disposed in the aperture, and movable in a circle about the input shaft axis in response to rotation of the spindle. The input shaft is rotatable about the input shaft axis in response to circular movement of the driving portion and the driving portion is free from connection with the second end portion of the spindle and contactably engaged by the second end portion in response to rotation of the spindle.

In yet another aspect of the present invention, a work vehicle has a frame and a steering mechanism. The steering mechanism has a housing and an output member and a steering motor. The output member has first and second ends, a longitudinal axis extending past the first and second ends, and an aperture extending along the axis and opening at the ends. The output member is mounted in the housing and rotatable about the longitudinal axis. The motor is mounted on the housing and drivingly connected to the output member. A support bracket having first and second end portions is connected at the first end portion to the first end of the output member. The second end portion has first and second spaced apart sides and a bore disposed in and opening at the first and second sides. A spindle having first and second opposed end portions, a longitudinal spindle axis extending between said spindle end portions, and an aperture opening at the second spindle end portion is rotatably mounted in the support bracket bore with the first spindle end portion adjacent the first side and the second spindle end portion adjacent the second side. A wheel is mounted on the first end portion of the spindle and rotatable with the spindle. A sensor having a body and an input shaft having an axis is rotatably connected to the body. A carrier having a support portion and a pilot portion is disposed in the bore adjacent the second side. A connecting apparatus secures the body to the carrier support portion and substantially aligns the axis of the input shaft with the axis of the spindle. A cover is connected to the support portion of the carrier and encloses the sensor. A coupling has a connecting portion mounted on the input shaft, and a drive pin connected to the connecting portion at a location radially spaced from the input shaft. The drive pin is axially disposed in an aperture of the spindle and movable in a circle about the input shaft in response to rotation of the spindle. The input shaft is rotatable about the input shaft axis in response to circular movement of the drive pin. The drive pin is free from rigid connection with the second end portion of the spindle and contactably engaged by the second end portion in response to rotation of the spindle. A conduit having first and second end portions is disposed in the aperture of the output member with its first end portion connected to the cover and its second end portion extending past the second end of the output member.

Because the sensor is positioned at the second end portion of the spindle, accessibility is easily obtained which will readily permit assembly and disassembly of the sensor relative to the axle assembly. Since the input shaft of the sensor is free from rigid connection with the second end portion of the spindle, no radial or axial loads will be transferred from the spindle to the sensor, thus reducing premature failure caused by side or axial loading of the input shaft. Because the body of the sensor is piloted by the carrier relative to the bore which supports the spindle, the amount of run out between the input shaft and spindle axis is minimized. Since the spindle rotates and the sensor is mounted adjacent the second end portion of the spindle and away from the wheel, the ability to connect a rigid conduit for conductor shielding purposes is made possible.

BEST MODE FOR CARRYING OUT THE INVENTION

Figure 1:
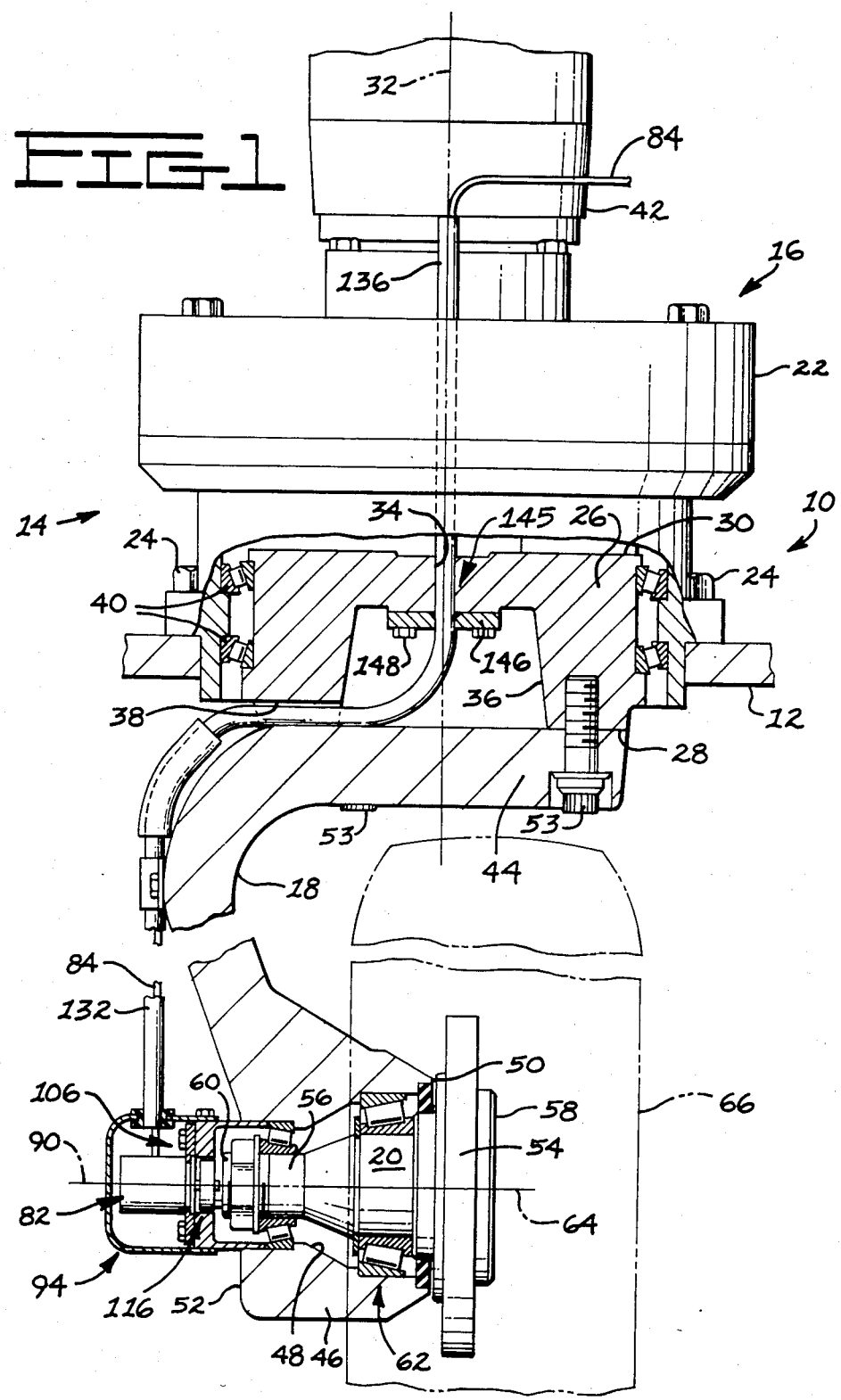
FIG. 1 is a partial diagrammatic side elevational view of an embodiment of the present invention showing a portion of a vehicle frame, a partially broken away steerable axle assembly mounted on the frame, and a sensor mounted on the axle assembly adjacent a rotatable wheel spindle.

With reference to the drawings and particularly FIG. 1, a vehicle 10, for example, a driverless automatic guided vehicle (AGV), has a frame 12 and a axle assembly 14. The axle assembly 14 has a steering mechanism 16, a support bracket 18, and a spindle 20.

The steering mechanism 16 has a housing 22 which is secured to the vehicle frame 12 by a plurality of fasteners 24. An output member 26 has first and second spaced apart ends 28,30, a central axis of rotation 32, and is mounted for rotation about the axis 32 in said housing 22. The first and second ends 28,30 are preferably parallel to one another and normal to the central axis 32. An aperture 34 is disposed in the output member 26 and opens at the first and second ends 28,30. Aperture 34 is preferably located along the axis 32. A recess 36 and radial opening 38 is provided in the first end 28 of the output member 26. A pair of bearings 40, preferably of the antifriction type, are disposed at spaced apart locations in the housing 22 and connect the output member 26 to the housing 22 for rotation about axis 32.

The steering mechanism 16 further includes a steering motor 42 which is mounted on the housing 22 in any suitable fashion. The steering motor 42 preferably has a rotary output (not shown) which is operatively connected to the output member 26. The output member 26 is rotatable in a clockwise or counterclockwise direction in response to rotation of the steering motor in a clockwise or counterclockwise direction.

The support bracket 18 has first and second end portons 44,46 and a bore 48 disposed in the second end portion 46 and opening at first and second sides 50,52 of the second end portion 46. The bracket first end portion 44 is connected to the first end 28 of the support bracket 18 by a plurality of threaded fasteners 53 screwthreadably connected to the output member 26.

Figure 2:
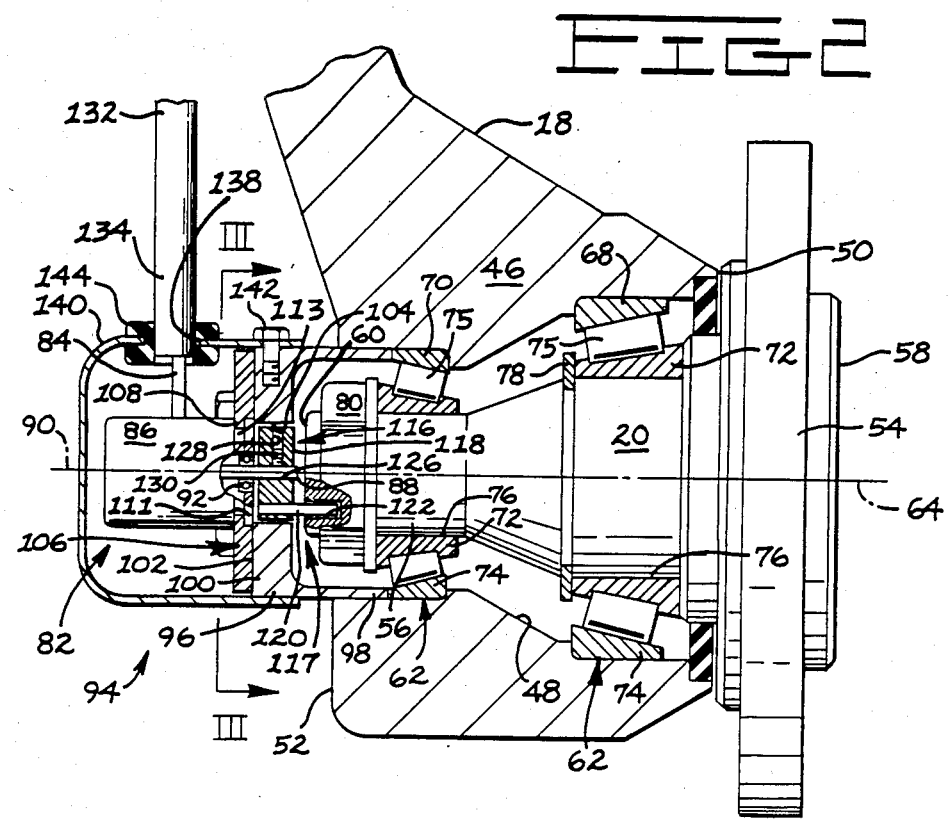
FIG. 2 is an enlarged diagrammatic sectional view of a portion of FIG. 1 showing in greater detail the spindle assembly, the sensor, and associated mounting and coupling components.

With reference to FIG. 2, the spindle 20 has first and second end portions 54,56, and first and second ends 58,60. Means 62 rotatably mounts the spindle 20 in the bore 48 for rotation about a longitudinal spindle axis 64. The spindle axis 64 extends along the spindle and past the first and second ends 58,60. The spindle first end portion 54 is positioned adjacent the first side 50 of the support brackets second end 46 and extends to a location past the first side 50, and the spindle second end portion 56 is located adjacent the second side 52 of the support brackets second end 46 and extends to a location past the second side 52. Preferably, the first and second ends 58,60 are located outwardly from the bore a preselected distance spaced from the first and second sides 50,52, respectively. The spindle first end portion 54 is adapted to mount a wheel, and the spindle second end portion 56 is adapted to be connected to a sensing device 82.

The means 62 preferably includes first and second antifriction bearings 68,70. Each of the bearings 68,70 have an inner race 72, an outer race 74, and a plurality of rollers 75 disposed between and in rolling contact with the inner and outer races. Each inner race has a bore 76 disposed therethrough, and each outer race 74 is press fitted into the bore 48 of the support bracket 18 at spaced apart locations. The first bearing 68 is located in the bore adjacent the first side 50 and the second bearing 70 is located in the bore adjacent the second side 52. Similarly, the first bearing 68 is located adjacent the first end portion 54 of the spindle 20, and the second bearing 70 is located adjacent the second end portion 56 of the spindle. A snap ring 78 is disposed in a groove in the spindle and retains the first bearing 68 on the spindle 20. A nut 80 is screwthreadably connected to the spindle second end portion 52 and retains the second bearing 70 on the spindle 20. The first bearing 68 has a greater diameter than that of the second bearing 70 and the bore 48 is stepped to accommodate the different bearing sizes. It should be noted that the nut 80 forces each of the bearings into engagement with shoulders in the bore so that a preselected amount of preload may be applied to the bearings.

Sensor 82, preferably referred to as a resolver, is provided to sense the rotational speed of the spindle 20 and the rotated position of the spindle 20 relative to a preset base position with extreme accuracy. The sensor 82 is adapted to deliver preferably more than one output signal to a control unit (not shown) via conductor(s) 84. The control unit is suitable for receiving the output signal and controlling operation of the AGV in response to the received signals and according to a predetermined set of instructions. In vehicles of this type, dead reckoning of the vehicle position is required to enable satisfactory operation. The sensor 82 has a body 86 and an input shaft 88 which is connected to the body for rotation about a longitudinal input shaft axis 90. Bearings 92, one of which is shown, rotatably mounts the input shaft in the body for rotation about the axis 90.

Figure 3:
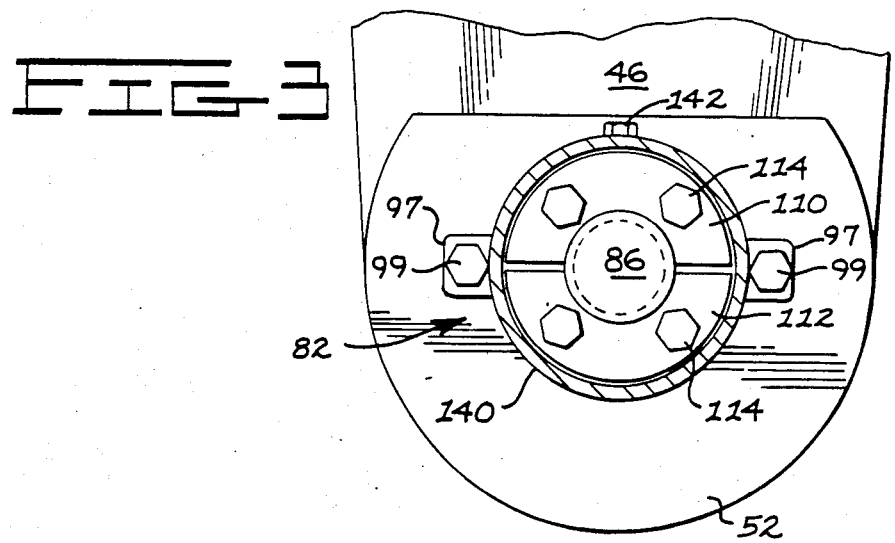
FIG. 3 is a side sectional view taken along lines III—III of FIG. 2 showing the sensor and connecting arrangement in greater detail.

Means 94 is provided for connecting the sensor body 86 to the second end portion 46 of the support bracket 20 at a location adjacent the second end 60 of the spindle 20 and for maintaining the axis 90 of the input shaft 88 within a preselected range of axially aligned positions relative to the spindle axis 64. The means 94 includes a carrier 96 which has a pilot portion 98 and a support portion 100. The pilot portion 98 is disposed in the bore 48 adjacent the second side 52 of the support bracket second end portion 46 and adjacent the second end portion 56 of the spindle 20. The pilot portion 98 is preferably cylindrical in shape and sized so that the bore 48 is only slightly larger in diameter so that accuracy of position of the carrier may be maintained. The support portion 100 has a support surface 102 and an aperture 104 disposed in and through the support portion 100. The sensor body 86 is mounted on the support portion 100 with the input shaft disposed in the aperture 104. With reference to FIG. 3, the carrier 96 has a plurality of tabs 97 which are connected to the pilot portion 98 and which extend radially therefrom. The tabs are affixed to the second side 52 by fasteners 99 which prevents axial movement of the carrier relative to axis 64.

With reference to FIGS. 2 and 3, means 94 also includes a clamp 106 which has a flange 108 and is connected to the support portion 100. The flange 108 is engageable with the sensor body 86 and adapted to connect the sensor body 86 to the support portion 100 and substantially align the input shaft axis 90 with the spindle axis 64. More specifically, the clamp 106 has first and second segments 110,112 which are affixed to support surface 102 by a plurality of threaded fasteners 114. The flange 108 of each of the segments 110,112 is disposed in a notch or annular groove 113 in the body 86 and forces a flange 111 defined by the groove 113 and body 86 into engagement with the support surface 102. Thus, the sensor body is clamped in engagement with the support surface 102 and retained from rotation by the clamp 106. It is to be noted that the means 94 substantially aligns the input shaft axis 90 with the spindle axis 64. However, due to manufacturing tolerances and the like, a preselected amount of run out between the axes will exist. Therefore, it is important to provide a means 116 for coupling the spindle second end portion 56 to the input shaft 88 and transferring only rotational motion from the spindle 20 to the input shaft 88.

Coupling means 116 therefor must be free to move axially and radially relative to the spindle axis 64 in order to prevent excessive side or axial loading to the input shaft 88 due to the aforementioned run out. The coupling 116 has a drive portion 117 which preferably includes connecting member 118 which is mounted on the input shaft 88, and a cylindrical drive pin 120 which is secured to the connecting member 118. The drive pin 120 is located on the connecting member 118 at a preselected radially spaced location from the axis of the input shaft 88 and extends from the connecting member in a direction substantially parallel to the input shaft 88 and towards the second end portion 56 of the spindle 20. The connecting member 118 has a cylindrical disc shaped configuration and is secured to the input shaft 88 and rotatable therewith. The spindle 20 has an aperture 122 which is disposed in the second end portion 56 and opens at the spindle second end 60. The drive pin 120 is disposed in the aperture 122 and engageable by the second end portion 56 of the spindle 20 in response to rotation of the spindle 20. The pin 120 is loosely fitted in the aperture 122 so that there is a preselected amount of freedom of movement between the spindle 20 and input shaft 88. The amount of freedom provided is equated to and a function of the amount of run out between axis 64 and 90. The aperture 122 can take several forms including cylindrical bore slots, notches, grooves, holes, recesses, and the like. Preferably the aperture 122 is a cylindrical bore having a preselected diameter which is greater in magnitude than that of the diameter of the pin 120.

The connecting member 118 has a bore 126, a threaded aperture 128 opening in the bore 126, and a fastener 130 screwthreadably engaged with the threaded bore. The input shaft 88 is disposed in the bore 126 and engaged by the fastener 130. The fastener 130 secures the input shaft 88 to the connecting member 118 so as to prevent relative axial and rotary motion.

A conduit 132 having first and second end portions 134,136 is disposed in aperture 34 of output member 26 and extends past the first and second ends 28,30. The first end portion 134 is connected to the connecting means 94 and the second end portion 136 extends through the housing 22 to a location spaced externally of the housing 22. The conduit first end portion 134 is disposed in an aperture 138 in cover 140 and is suitable for passing conductor 84 therethrough. The cover 140 is disposed in an overlying and covering relationship about the sensor 82 and connected to the support portion of the carrier 96 via fastener 142. A rubber grommet 144 is disposed in the aperture 138 and cover 140 and seals the cover 140 to the first end portion 134 of conduit 132.

A means 145 for securing the conduit 132 to the output member 26 is provided. Specifically, a flange 146, which is brazed to conduit 132, is disposed in recess 36 and connected to the output member 26 via a plurality of fasteners 148. Therefore, the conduit 132 is rotatable with and in response to rotation of the output member 26.

INDUSTRIAL APPLICABILITY

With reference to the drawings, the output member 26 of the axle assembly 14 is rotatable about axis 32 in response to actuation of motor 42 which pivots wheel 66 and thereby steers the vehicle 10. The sensor 82 responds to rotation of the wheel 66, which is caused by travel of the vehicle, about axis 64 and delivers a control signal suitable for informing the control unit of the distance travelled from a set point and the travel speed. Conduit 132 shields the conductor 84 from damage by external objects and insures that signal(s) delivered from the sensor 82 reach the control unit.

The means 94 secures the sensor 82 at the proper location relative to the spindle 20 so that the spindle axis 64 and input shaft axis 90 are substantially aligned so that undesirable axial and radial forces being applied to the input shaft 88 are kept at a minimum. Also, the connecting means 94 enables the sensor to be easily accessed due to its attachment to the support bracket 18 adjacent the second side 52 of the support bracket. The coupling means 116 further insures that only rotational forces are transmitted from the rotatable spindle 20 to the input shaft 88 and thereby enhancing the life of the sensor 82. The cover 140 further protects the sensor 82 from damage due to impact contamination and the like and thereby extends the life of the sensor 82.

Rotation of spindle 20 about axis 64, due to travel of the vehicle, will result in contact between the spindle's second end portion 56 and drive pin 120 which is disposed in spindle aperture 122. As a result of rotation of the spindle 20, the drive pin 120 will orbit about the input shaft 88 and rotate connecting member 118. Because the connecting member 118 is secured to the input shaft 88, rotation of the connecting member 118 will result in rotation of the input shaft 88 about the input shaft axis 90. Because of the clearance between the drive pin 120 and the aperture 122, axial or radial motion of either the sensor 82 or spindle 20 will be permitted without causing side or axial loading of the input shaft 88. Thus, premature damage to the input shaft bearings 92 and failure of the sensor 82 are eliminated.

Because the conduit 132 extends from the cover 140, through the output member 26, and through the housing 22, the conductor 84 is fully protected within and external of the housing 22. Since there is substantially no relative motion between the conduit 132 and the conductor 84, the chance of damage to the conductor 84 caused by rubbing is substantially reduced. Also, the conduit 132 shields the conductor 84 from grease, oil, dirt, and the like, both internal and external of the housing 22.

Other aspects, objects, and advantages of this invention can be obtained from a study of the drawings, the disclosure, and the appended claims.

We claim:

1. An axle assembly, comprising:
    a housing;
    an output member having a first end and being rotatably connected to said housing;
    a support bracket having first and second end portions and being connected at said first end portion to the first end of said output member, said second end portion having first and second spaced apart sides, and a bore opening at said sides;
    a wheel;
    a spindle having first and second end portions and a longitudinal spindle axis extending between said spindle end portions, said spindle being mounted in said bore and rotatable about said spindle axis, said spindle first end portion being connected to said wheel;
    a sensor having a body and an input shaft rotatably connected to said body, said input shaft having a longitudinal axis;
    means for connecting the sensor body to the second end portion of the support bracket at a location adjacent the second end portion of the spindle and maintaining the axis of the input shaft within a preselected range of axially aligned positions with respect to the axis of the spindle; and
    means for coupling the second end portion of the spindle to the input shaft and transferring rotational motion from the spindle to the input shaft, said coupling means including a drive portion connected to said input shaft and engageable with said spindle, said drive portion being axially and radially movable relative to the spindle second end portion.

2. An axle assembly, comprising:
    a housing;
    an output member having a first end and being rotatably connected to said housing;
    a support bracket having first and second end portions and being connected at said first end portion to the first end of said output member, said second end portion having first and second spaced apart sides, and a bore opening at said sides;
    a spindle having first and second end portions and a longitudinal spindle axis extending between said spindle end portions, said spindle being mounted in said bore and rotatable about said spindle axis;
    a sensor having a body and an input shaft rotatably connected to said body, said input shaft having a longitudinal axis;
    means for connecting the sensor body to the second end portion of the support bracket at a location adjacent the second end portion of the spindle and maintaining the axis of the input shaft within a preselected range of axially aligned positions with respect to the axis of the spindle; and
    means for coupling the second end portion of the spindle to the input shaft and transferring rotational motion from the spindle to the input shaft, said coupling means including;
        a connecting member mounted on said input shaft;
        a drive pin secured to said connecting member at a preselected radially spaced location from the axis of said input shaft, said drive pin extending from said connecting member in a direction substantially parallel to said input shaft axis; and
        said spindle having an aperture disposed in the spindle second end portion, said drive pin being disposed in said aperture and engageable with said spindle in response to rotation of said spindle.

3. The axle assembly, as set forth in claim 2, wherein said connecting means includes:
    a carrier having a pilot portion and a support portion, said pilot portion being disposed in said support bracket bore adjacent the second side; and
    a clamp having a flange and being connected to said support portion, said flange being engageable with the sensor body and adapted to secure the sensor body to said support portion.

4. The axle assembly, as set forth in claim 3, wherein said sensor body has a flange, said clamp flange being engageable with the sensor body flange, and said connecting means includes a plurality of fasteners screwthreadably connecting the clamp to said support portion.

5. The axle assembly, as set forth in claim 4, wherein said clamp flange is segmented.

6. The axle assembly, as set forth in claim 4, wherein said support portion has an aperture and said input shaft extends into the support portion aperture, said connecting means includes:
a cover having an aperture and being connected to the support portion in an overlying relationship about the sensor; and
a conduit having a first end portion and being disposed in said cover aperture.

7. The axle assembly, as set forth in claim 2, including:
a pair of antifriction bearings each having an outer race and an inner race, said inner races having a bore, said outer races being disposed, at spaced apart locations, in the bore of said support bracket, and said spindle being disposed in the bore of said inner races.

8. The axle assembly, as set forth in claim 7, wherein said spindle has a second end adjacent the spindle second end portion and wherein the aperture in the second end portion of the spindle opens at said spindle second end.

9. The axle assembly, as set forth in claim 8, wherein said connecting member has a bore, a threaded aperture opening in said bore, and a fastener screwthreadably engaged with said threaded aperture, said input shaft being disposed in the bore of said connecting member and engaged by said fastener, said fastener securing the input shaft to the connecting member.

10. The axle assembly, as set forth in claim 2, wherein said output member has an axis of rotation, an aperture disposed along said output member axis and opening at said first end, and including:
a conduit having first and second end portions and being disposed in the aperture of said output member and extending past the first end of said output member, said conduit first end portion being connected to said connecting means; and
means for securing the conduit to said output member.

11. A steerable axle assembly, comprising:
a housing;
an output member rotatably connected to said housing, said output member having a first end;
a support bracket having first and second end portions and being connected at said first end portion to the first end of said output member, said second end portion having first and second spaced apart sides and a bore disposed in said second end portion and opening at said first and second sides;
a spindle having first and second end portions, first and second opposed ends, and a longitudinal spindle axis extending between the first and second ends of said spindle, said spindle having an aperture disposed in the spindle second end portion and opening at the second end of the spindle;
means for rotatably mounting the spindle in the support bracket bore for rotation about said longitudinal spindle axis, said spindle first end portion being adapted to be connected to a ground engaging wheel, and said spindle second end portion being positioned adjacent the second side of said support bracket;
a sensor having a body and an input shaft rotatably connected to said body, said input shaft having a longitudinal axis and being rotatable about said input shaft longitudinal axis;
means for connecting the sensor body to the second end portion of the support bracket adjacent the support bracket second side and substantially aligning the longitudinal axis of the input shaft with the longitudinal axis of said spindle; and
a coupling having a driving portion and being mounted on said input shaft, said driving portion being radially spaced from said input shaft and axially disposed in said spindle aperture, said driving portion being movable in a circle about the input shaft axis in response to rotation of said spindle, said input shaft being rotatable about the input shaft axis in response to movement of the driving portion about said input shaft axis, said driving portion being free from connection with the second end portion of the spindle and contactably engaged by said spindle second end portion in response to rotation of the spindle.

12. The steerable axle assembly, as set forth in claim 11, wherein said coupling includes:
a connecting member having a bore, said input shaft being disposed in the bore of said connecting member;
a fastener screwthreadably secured to said connecting member and engaged with said input shaft; and
a cylindrical pin being secured to said connecting member at a radially offset location relative to said input shaft axis, said cylindrical pin extending substantially parallel to said input shaft axis.

13. The steerable axle assembly, as set forth in claim 12, wherein said aperture is a cylindrical bore extending in a direction substantially parallel to said spindle axis.

14. The steerable axle assembly, as set forth in claim 13, wherein the cylindrical bore in the second end portion of the spindle has a preselected diameter, and said cylindrical pin has a preselected diameter, said diameter of the cylindrical bore being greater in magnitude than the diameter of the cylindrical pin.

15. The steerable axle assembly, as set forth in claim 11, wherein said connecting means includes:
a carrier having a pilot portion and a support portion, said pilot portion being disposed in the bore of said support bracket at a location adjacent said second side, said support portion having an aperture and said sensor being positioned on said support portion with said input shaft disposed in the support portion aperture; and
a clamp having a flange and being connected to said support portion, said flange being engageable with said sensor body.

16. The steerable axle assembly, as set forth in claim 11, wherein said output member has an axis of rotation, a second end, and an aperture extending along said axis and opening at said first and second ends; and including:
a conduit having first and second end portions and being disposed in the aperture of said output member, said conduit extending past said first and second output member ends and through said housing, said conduit first end portion being connected to the sensor body connecting means.

17. A work vehicle, comprising:
a frame;

a steering mechanism having a housing, an output member, and a steering motor, said output member having first and second ends, a longitudinal axis extending past said first and second ends, and an aperture extending along said axis and opening at said ends, said output member being mounted in said housing and rotatable about said longitudinal axis, said motor being mounted on said housing and drivingly connected to said output member;

a support bracket having first and second end portions and being connected at said first end portion to the first end of said output member, said support bracket second end portion having first and second spaced apart sides, and a bore disposed in said second end portion and opening at said first and second sides;

a spindle having first and second opposed end portions and a longitudinal spindle axis extending between said spindle end portions, said spindle having an aperture opening at the second spindle end portion;

means for mounting the spindle in said bore for rotation about the longitudinal spindle axis, and locating said spindle first end portion adjacent the first side and said second spindle end portion adjacent the second side;

a wheel mounted on the first end portion of the spindle and rotatable with the spindle;

a sensor having a body and an input shaft rotatably connected to the body, said input shaft having a longitudinal input shaft axis and being rotatable about said axis;

a carrier having a pilot portion and a support portion, said pilot portion being disposed in said support bracket bore adjacent the second side;

means for connecting the sensor body to the carrier support portion and substantially axially aligning the axis of the input shaft with the axis of the spindle;

a cover connected to the support portion of the carrier and enclosing the sensor;

a coupling having a connecting member and a drive pin, said connecting member being mounted on said input shaft, said drive pin being affixed to said connecting member and radially spaced from said input shaft, said drive pin being axially disposed in said spindle aperture and movable in a circle about said input shaft in response to rotation of said spindle, said input shaft being rotatable about the input shaft axis in response to movement of the drive pin about said input shaft axis, said drive pin being free from connection with the second end portion of the spindle and contactably engaged by the spindle second end portion in response to rotation of the spindle; and a conduit having first and second end portions and being disposed in the aperture of said output member, said conduit first end portion being connected to said cover and said conduit second end portion extending past the second end of said output member.

* * * * *